(12) United States Patent
Yamazaki et al.

(10) Patent No.: US 7,466,465 B2
(45) Date of Patent: Dec. 16, 2008

(54) LOAD ALLOCATION WHEN EXECUTING IMAGE PROCESSING USING PARALLEL PROCESSING

(75) Inventors: Satoshi Yamazaki, Nagano-ken (JP); Toshiaki Kakutani, Nagano-ken (JP); Teruyuki Takata, Nagano-ken (JP); Kohei Utsunomiya, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 372 days.

(21) Appl. No.: 11/212,431

(22) Filed: Aug. 24, 2005

(65) Prior Publication Data

US 2006/0056693 A1 Mar. 16, 2006

(30) Foreign Application Priority Data

Aug. 25, 2004 (JP) ............... 2004-245078

(51) Int. Cl.
*H04N 1/52* (2006.01)
*H04N 1/405* (2006.01)
*G06K 15/00* (2006.01)
*H04N 1/40* (2006.01)
*H04N 1/46* (2006.01)
*G06F 9/46* (2006.01)

(52) U.S. Cl. ............... 358/534; 358/1.9; 358/3.03; 358/3.05; 358/3.06; 382/304; 718/105

(58) Field of Classification Search ............... 358/1.9, 358/3.03, 3.05, 3.06, 534; 382/304; 718/105
See application file for complete search history.

(56) References Cited

U.S. PATENT DOCUMENTS 5,765,146 A * 6/1998 Wolf et al. ............... 707/2
5,881,283 A * 3/1999 Hondou et al. ............... 718/100
5,930,010 A * 7/1999 Cheung et al. ............... 358/534

(Continued)

FOREIGN PATENT DOCUMENTS

JP 2000-293674 10/2000

(Continued)

OTHER PUBLICATIONS

Performance Modeling of Operating Systems Using Object-Oriented Simulation—A Practical Introduction. Garrido, Jose M. Print (c) 2000 Kluwer Academic/Plenum Publishers. First Edition. pp. 85-109.*

(Continued)

*Primary Examiner*—Twyler L. Haskins
*Assistant Examiner*—Fred Guillermety
(74) *Attorney, Agent, or Firm*—Martine Penilla & Gencarella, LLP

(57) ABSTRACT

For image processing for repeatedly executing process segment sets including N (N is an integer of 3 or greater) unit process segments Lc, Lm, Ly, Lk, Llc, Llm and Ldy, unit process segments are executed by M (M is an integer of 2 or greater but less than N) processing units. The unit process segments include a first-type unit process segments Lc, Llc, Llm, and Lk for performing processing using a first processing method and a second-type unit process segment Lm, Ly and Ldy for performing processing using a second processing method that is different from the first processing method. Then, when executing process segment sets, the M unit process segments including at least one each of the first-type and the second-type unit process segments Lc, Lm are first executed on the M processing units.

18 Claims, 9 Drawing Sheets

U.S. PATENT DOCUMENTS

| | | | |
|---|---|---|---|
| 6,532,016 B1 * | 3/2003 | Venkateswar et al. | 345/504 |
| 2003/0137698 A1 * | 7/2003 | Pritchard | 358/3.06 |
| 2004/0008382 A1 * | 1/2004 | Barbalet | 358/3.03 |
| 2004/0207879 A1 * | 10/2004 | Bailey et al. | 358/3.03 |
| 2005/0141017 A1 * | 6/2005 | Matsumura | 358/1.15 |
| 2005/0260021 A1 * | 11/2005 | Abello | 400/62 |

OTHER PUBLICATIONS

Abstract of Japanese Patent Publication No. 2000-293674, Pub. Date: Oct. 20, 2000, Patent Abstracts of Japan.

* cited by examiner

LOAD ALLOCATION WHEN EXECUTING IMAGE PROCESSING USING PARALLEL PROCESSING

BACKGROUND OF THE INVENTION

1. Field of the Invention

The present invention relates to technology for executing parallel image processing.

2. Description of the Related Art

There has been developed a parallel processing technology for use in converting image data expressing tone values of each color of ink of each pixel to image data expressing the absence or presence of ink color dots for each pixel. For example, in JP2000-293674A, disclosed is technology for executing rasterizing (data rearranging) processing and halftone processing according to the processing contents using separate threads.

However, for the technology noted above, there was no consideration for efficient execution of each thread of the halftone processing of each color allocated to each processing unit.

An object of the present invention is to provide a technology for efficiently executing parallel image processing.

The present invention is related to Japanese patent applications No. 2004-245078, filed Aug. 25, 2004 and No. 2004-245085, filed Aug. 25, 2004; the contents of which are incorporated herein by reference.

SUMMARY OF THE INVENTION

To achieve the purpose noted above, the following processes are performed in the image processing. M processing units are provided. M is an integer of at least two. A plurality of process segment sets are prepared. Each of the plurality of process segment sets has N unit process segments. N is an integer of at least three and greater than M. The N unit process segments includes a first-type process segment using a first processing method and a second-type process segment using a second processing method different from the first processing method. The N unit process segments of each process segment set are executed using the M processing units. Selected M unit process segments among the N unit process segments are first executed in parallel by the M processing units. The M unit process segments includes at least one first-type process segment and at least one second-type segment.

By using this embodiment, at least when starting processing of a process segment set, it is possible to process both of the first-type and second-type unit process segments in parallel using M processing units. As a result, the possibility of processing efficiency dropping can be reduced which may be caused by over concentration of the load on a specific element within the device for executing processing and having the element be a bottleneck of the processing capability. That is, it is possible to execute processing efficiently when executing image processing using parallel processing.

Each of the unit process segments may be halftone processing. The unit process may preferably be a halftone processing for specified colors in relation to an area of a specified size within an image. The process segment set may be a set of N halftone process segments for a same area of an image. The process segment set may be executed in the aligned order for mutually adjacent areas within the image.

The first processing method may be an error diffusion method and the second processing method may be a dither method.

The following processes are preferable when processing the process segment set. Loads of the N unit process segments in a next process segment set are estimated based on a result of unit process segments in a preceding process segment set. Then the N unit process segments are allocated to the M processing units based on the estimated loads. The N unit process segments are executed on the M processing units in allocated sequences.

When allocating unit process segments to the processing unit, it is preferable to perform processing like the following. (i) One unit process is selected from among remaining unit process segments which are not yet allocated to one of the processing units in the next process segment set according to a priority sequence. In the priority sequence, the first-type unit process segment and the second-type unit process segment are aligned alternately; the first-type unit process segments are aligned each other in sequence of decreasing estimated load; and the second-type unit process segments are aligned each other in sequence of decreasing estimated load. (ii) The selected unit process segment is allocated to a processing unit having a lowest total estimated load of already allocated unit process segments among the M processing units. The processes (i) and (ii) are executed repeatedly.

With this kind of aspect, using accurately estimated loads based on the immediately prior execution results, it is possible to reduce the load difference between the processing units. At the same time, it is possible to allocate unit process segments to each of the processing units so as to make it likely for the first-type and the second-type unit process segments to be parallel processed.

When allocating unit process segments to the processing unit, it is possible to perform processing like that described below. (i) One unit process segment is selected from among unit process segments which are not yet allocated to one of the processing units in the next process segment set according to a priority sequence of decreasing estimated loads. (ii) The selected unit process segment is allocated to a processing unit having a lowest total estimated load of already allocated unit process segments among the M processing units. (iii) The operations (i) and (ii) are executed repeatedly. When executing unit process segments, it is possible to perform processing like that described below. A plurality of allocated second-type unit process segments are executed continuously prior to allocated first-type unit process segment on at least one of the M processing units. A plurality of allocated first-type unit process segments are executed continuously prior to allocated second-type unit process segment on at least one of the other processing units of the M processing units. With this type of aspect as well, based on an accurately estimated load, it is possible to reduce the load difference between the processing units, and at the same time, it is possible to allocate unit process segments to each processing unit so as to make it likely for the first-type and the second-type unit process segments to be parallel processed.

Note that it is preferable to classify the N unit process segments into (a) unit process segments that are subject to unit process segment allocation according to the aforementioned priority sequence and (b) unit process segments for load balancing that are not subject to the unit process segment allocation according to the aforementioned priority sequence and the estimated loads are lower than that of the unit process segments subject to the unit process segment allocation. After the unit process segment allocation according to the priority sequence, the unit process segments that were not subject to the unit process segment allocation are allocated to a processing unit having a lowest total estimated load of already allocated unit process segments. With this kind of aspect, it is possible to more finely equalize the variance of the loads between processing units using a unit process segment for which the estimated load is small.

Note that while having the unit process segments executed on the processing units, it is possible to allocate the unit process segments to be processed next to the processing units being executed. In the aspect, loads of the N unit process segments in a next process segment set are estimated based on a result of unit process segments in a process segment set executed immediately prior. Then the N unit process segments are allocated to the M processing units based on the estimated loads and are executed on the M processing units.

When allocating and executing the unit process segments, it is possible to perform processing like that described below. (i) One unit process is selected from among unit process segments which are not yet allocated to one of the processing units in the next process segment set according to the priority sequence. (ii) Then the selected unit process segment is allocated to a processing unit for which unit process segments to be processed first run out among the M processing units, and is executed on the processing unit. The operations (i) and (ii) are executed repeatedly. With this kind of aspect, it is possible to allocate each of the unit process segments to the processing units based on the actual processing results.

According to a priority sequence of decreasing estimated loads, one unit process segment may be selected from among unit process segments which are not yet allocated to one of the processing units in the next process segment set. Then the selected unit process segment may be allocated to a processing unit for which unit process segments to be processed first run out among the M processing units, and may be executed on the processing unit. With this kind of aspect, it is possible to reduce the load difference between the processing units. As a result, it is possible to process segment sets in a short time.

It is preferable to classify the N unit process segments into (a) unit process segments that are subject to unit process segment allocation according to the aforementioned priority sequence and (b) unit process segments for load balancing that are not subject to the unit process segment allocation according to the aforementioned priority sequence and their estimated loads are lower than that of the unit process segments subject to the unit process segment allocation. When allocating unit process segments to the processing unit, it is preferable to perform the operation described below. After the unit process segment allocation according to the priority sequence, the unit process segments that were not subject to the unit process segment allocation are allocated to a processing unit for which unit process segments to be processed first run out, and are executed on the processing unit. With this aspect, it is possible to perform load balancing of the processing units at a finer level.

Note that the image processing device can have an aspect for executing process segment sets using hyper threading. With this aspect, the processing units may be thread processing units.

The present invention can be realized in various embodiments. For example, it can be realized in embodiments such as a process allocation method, a process allocation device, an image processing method, an image processing device, a printing control method, a printing control device, a printing method, a printing device, and also as a computer program for realizing the functions of those methods or devices or a recording medium on which that computer program is recorded, or the like.

These and other objects, features, aspects, and advantages of the present invention will become more apparent from the following detailed description of the preferred embodiments with the accompanying drawings.

DETAILED DESCRIPTION OF THE INVENTION

Embodiments of the invention are described in the following sequence.

Figure 6A:
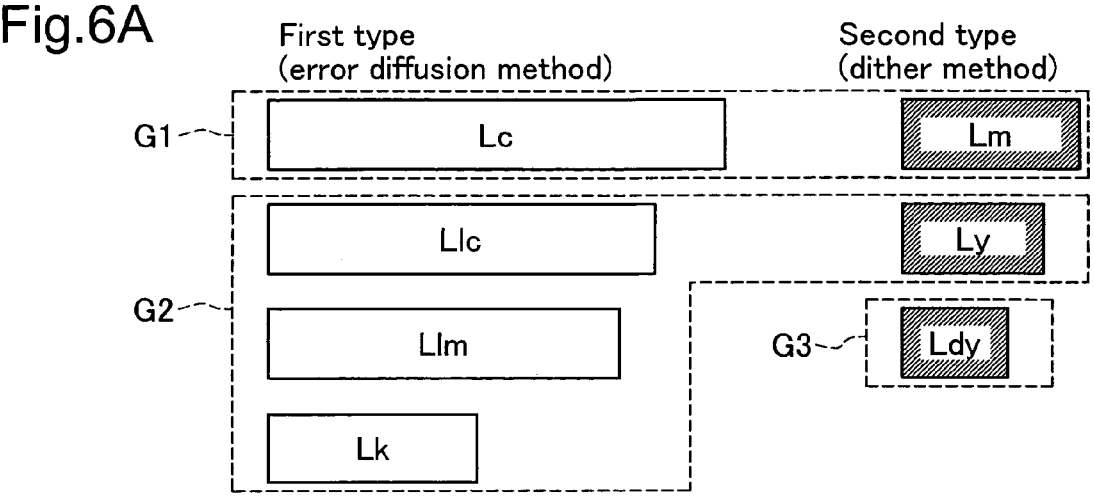
FIGS. 6A to 6C show the procedure for allocating unit HT process segments.
Figure 6B:
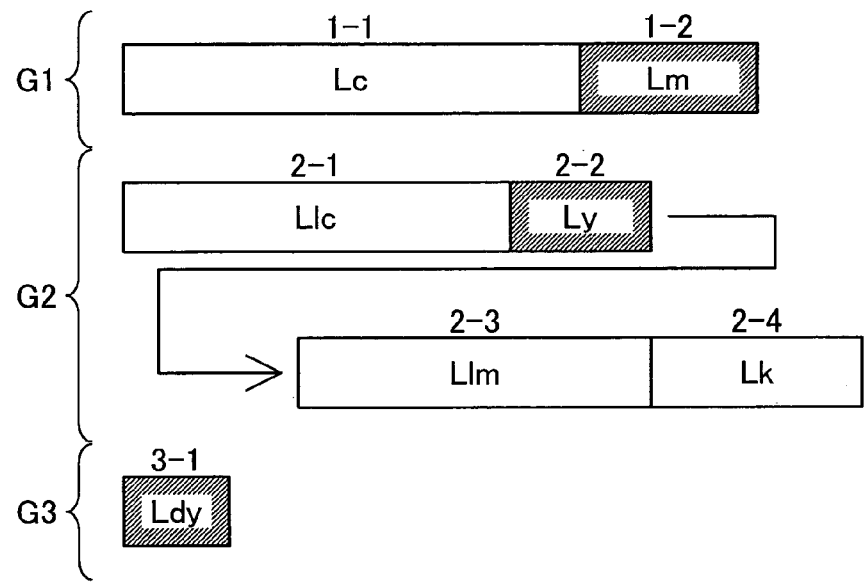
Figure 6C:
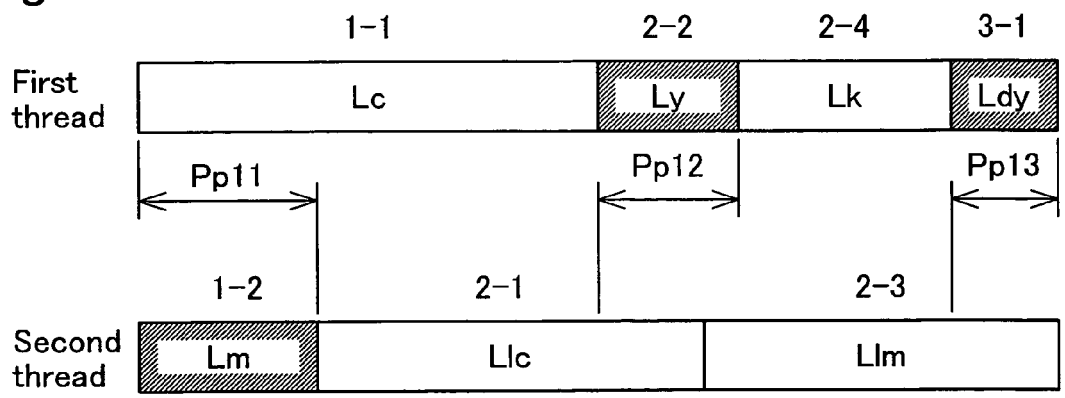

A. Summary of Preferred Embodiments:
B. First Embodiment:
B1. Overall Structure of the Device
B2. Internal Structure of the CPU
B3. Color Conversion Processing and Halftone processing
C. Second Embodiment:
D. Third Embodiment:
E. Modifications:

A. Summary of Preferred Embodiments:

At a printer driver 96, using two threads 99c and 99d, halftone processing is performed (see FIG. 6C). In halftone processing of the ink colors, some ink colors are processed by the dither method and the others are processed by the error diffusion method. The halftone processing for one ink color will be hereinafter referred to as "unit HT process segment" or "process segment." When executing the halftone processing, a process segment using the dither method and another process segment using the error diffusion method are placed at the start of two threads respectively. By arranging in this way, at least for processing the beginning of each thread, it is less likely to cause frequent memory access waits due to parallel processing of the error diffusion method segments.

After that, halftone process segments for the other colors are allocated according to a priority sequence such that each new process segment is allocated to the thread for which the total estimated load is lowest up to that point. This priority sequence is set such that the dither method process segments and the error diffusion method process segments are aligned alternately, and so that the dither method process segments and the error diffusion method process segments are respectively aligned of decreasing estimated load (see FIG. 6C 2-1 to 2-4). Then, separate from these, finally, the process segments with the smallest estimated load is allocated (see FIG. 6C 3-1). By working in this way, the halftone process segments using the error diffusion method are less likely to be executed simultaneously in the thread and the loads of the threads will be equalized.

B. First Embodiment

B1. Overall Constitution of the Device

Figure 1:
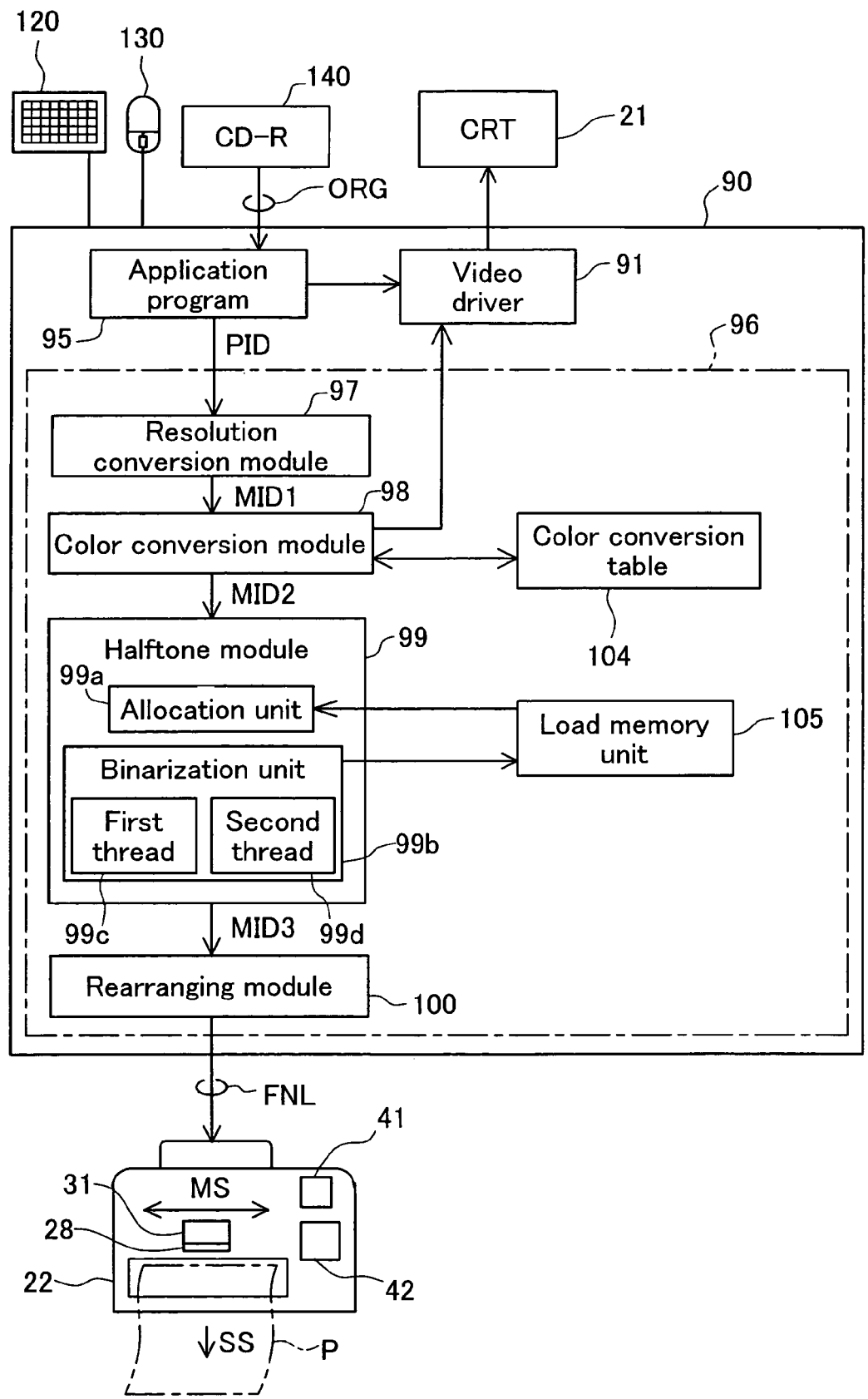
FIG. 1 is a block diagram showing the constitution of the printing system software of the first embodiment.

FIG. 1 is a block diagram showing the software configuration of the printing system of the first embodiment. With a computer 90, an application program 95 operates under a specified operating system. Also, a video driver 91 and the printer driver 96 are incorporated in the operating system.

The application program 95 reads original image data ORG consisting of the three color components red (R), green (G), and blue (B) from a CD-R 140, according to user instructions input from a mouse 130 or a keyboard 120. Then, processing such as image retouching is performed on the original image data ORG according to the user instructions. The application program 95 displays processed images on the CRT display 21 via the video driver 91. Also, when printing instructions are received from the user, the application program 95 issues printing instructions to the printer driver 96, and supplies a processed image as initial image data PID to the printer driver 96.

The printer driver 96 receives the initial image data PID from the application program 95 and converts the PID to printing image data FNL that can be processed by the printer 22 (here, this means multi-valued signals for the seven colors cyan, magenta, yellow, black, light cyan, light magenta, and dark yellow).

With the example shown in FIG. 1, comprised within the printer driver 96 are a resolution conversion module 97, a color conversion module 98, a color conversion table 104, a halftone module 99, a load memory unit 105, and a rearranging module 100.

The resolution conversion module 97 converts the initial image data PID into the image data MID1 which has the resolution for printing with the printer 22. For color image printing, while referencing the color conversion table 104 which is a 3D lookup table, the color conversion module 98 converts the image data MID1 expressed by colors of each of the pixels with the RGB tone values to image data MID2 expressed by the colors of each pixel with the tone values of cyan (C), magenta (M), yellow (Y), black (K), light cyan (LC), light magenta (LM), and dark yellow (DY) used by the printer 22.

Note that "light cyan" is an ink with the same hue as cyan but of a lighter color than cyan. "Light magenta" is an ink with the same hue as magenta but of a lighter color than magenta. "Dark yellow" is an ink that is the same hue as yellow but of a darker color than yellow.

By performing halftone processing on the image data MID2, for which the density of each color of each pixel is expressed by the tone values of each color, the halftone module 99 converts the image data MID2 to image data MID3 (also called "printing data" or "dot data"), for which the density of each color is expressed by the presence or absence of dots for each pixel. The halftone processing is also called "binarization processing." This halftone processing is performed using the error diffusion method on light cyan (LC), light magenta (LM), and cyan (C), and using the dither method on magenta (M), yellow (Y), black (K), and dark yellow (DY).

The "dither method" is a method that compares (a) an n×m dither matrix (n and m are positive integers) having respective thresholds within elements corresponding to each pixel and (b) partial image areas consisting of n×m pixels, and which determines the presence or absence of dot formation by whether or not the tone value held by each pixel of the partial image area is higher than the threshold value. The "error diffusion method" is a method that determines the presence or absence of dot formation on one subject pixel based on the comparison of the tone value and the threshold, and that allocates the difference (error) between (a) density reproduction according to the presence or absence of dot formation and (b) the density specified by the tone value of multiple gradations, to other pixels that are not yet a subject pixel by addition of the error on the tone values of those pixels.

Generally, when doing halftone processing of the same data, the processing load is lower when performed using the dither method than when performed using the error diffusion method. However, the image printing result is generally of higher quality when the halftone processing is performed using the error diffusion method. Here, for light cyan and light magenta inks for which quality of the printing results are easier to see, the halftone processing is performed using the error diffusion method. For yellow ink, for which quality of the printing results is not easy to see, the halftone processing is performed using the dither method. For other ink colors, the load that the overall halftone processing gives to the system is considered and a determination is made of which method to use.

The image data MID3 generated with the halftone module 99 is rearranged by the rearranging module 100 into the data order in which to transfer to the printer 22, and is finally output as the printing image data FNL.

The printer 22 comprises a mechanism for conveying the paper P by a paper feed motor, a mechanism for moving the carriage 31 using a carriage motor back and forth in the direction MS which is perpendicular to the direction SS for the paper P conveyance, a printing head 28 incorporated on the carriage 31 for ink ejecting and dot formation, a P-ROM 42 for storing various types of setting data, and a CPU 41 for controlling the paper feed motor, the carriage motor, the printing head 28, the P-ROM 42, and an operating panel 32. The printer 22 receives the printing image data FNL, and executes printing by forming dots on the printing medium using various inks including cyan (C), magenta (M), yellow (Y), black (K), light cyan (LC), light magenta (LM), and dark yellow (DY) according to the printing image data FNL.

Note that for this specification, "printing device" in a narrow sense indicates only the printer 22, but in a broad sense expresses the overall printing system including the computer 90 and the printer 22.

B2. Internal Structure of the CPU

CPU 90a of the computer 90 is a CPU that is compatible with hyper threading technology. This CPU 90a is capable of processing two threads in parallel. In FIG. 1, these two threads are indicated as first thread 99c and second thread 99d. Hereafter, the constitution and operation of the CPU 90a compatible with hyper thread technology is described.

Figure 2:
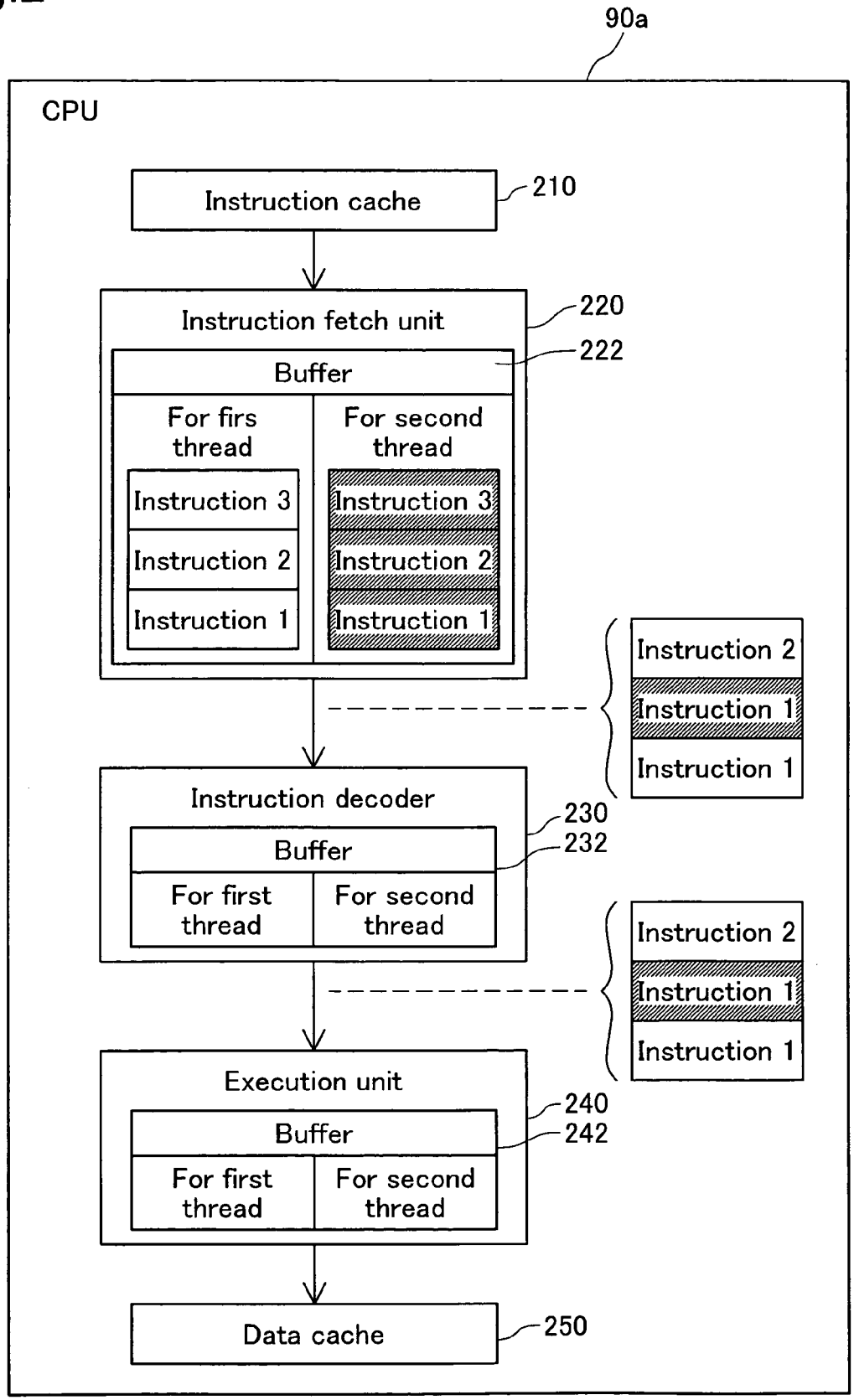
FIG. 2 is a block diagram showing the processing within the CPU 90a of the computer 90.

FIG. 2 is a block diagram showing the process within the CPU 90a of the computer 90. The CPU 90a internally comprises an instruction fetch unit 220, an instruction decoder 230, an execution unit 240, an instruction cache 210, and a data cache 250. Then, the instruction fetch unit 220, the instruction decoder 230, and the execution unit 240 respectively comprise buffers 222, 232, and 242 for temporarily storing the processed instructions and data. The buffers 222, 232, and 242 are respectively divided for first thread use and for second thread use.

Stored in the instruction cache 210 are instructions that have already been used once and instructions that are expected to be used continuing after the used and stored instructions. The instruction fetch unit 220 specifies the address of the instruction cache 210 and fetches instructions. At that time, the first thread instructions are stored in the first thread buffer. The second thread instructions are stored in the second thread buffer. Note that when the required instruction is not within the instruction cache 210, the CPU 90a accesses the main memory (not illustrated) and fetches instructions.

After that, the instruction fetch unit 220 transfers the fetched instructions to the instruction decoder 230. At that time, one instruction of the first thread is sent to the instruction decoder 230 at odd numbered clock timing, and one instruction of the second thread is sent to the instruction decoder 230 at even numbered clock timing. Specifically, the first thread instruction and the second thread instruction are alternately sent to the instruction decoder 230. With FIG. 2, the second thread instruction is shown marked by hatching.

The instruction decoder 230 decodes and converts the sent instruction to microcodes, and stores them in the buffer 232. At this time, when the decoded instruction is a first thread instruction, the microcodes are stored in the first thread buffer. When the decoded instruction is a second thread instruction, the microcodes are stored in the second thread buffer.

After that, the instruction decoder 230 sends the decoded microcodes to the execution unit 240. At that time, one microcode of the first thread is sent to the execution unit 240 at odd numbered clock timing, and one microcode of the second thread is sent to the execution unit 240 at even numbered clock timing. The execution unit 240 performs the specified execution process, and the execution results are stored in the buffers for respective threads.

With the conventional CPU, the internal buffers in the instruction fetch unit 220, the instruction decoder 230, and the execution unit 240 are used altogether for one thread. When switching the thread being executed for a multi-thread process, the instruction decoder 230 and the execution unit 240 discard the previous thread instructions stored in the buffer until then, and need to receive the next thread instruction anew from the instruction fetch unit 220. Thus, the instruction decoder 230 and the execution unit 240 are idle until the instruction fetched by the instruction fetch unit 220 is newly supplied.

With the constitution of this embodiment of the present invention, the two threads alternately execute the microcodes. Also, the instructions or microcodes of the two threads are stored simultaneously within the buffers 222, 232, and 242 of the instruction fetch unit 220, the instruction decoder 230, and the execution unit 240. Because of this, when the execution of one instruction of one of the threads ends, the instruction fetch unit 220, the instruction decoder 230, and the execution unit 240 are able to use the instructions of the other thread within the buffer immediately and can start handling of the next microcode. To say this in another way, it is possible to make effective use of the pipeline. Also, when an exception or wait occur with one thread, it is possible to proceed with processing with the other thread.

Note that the combination of the units that respectively store the first thread instructions or microcodes of the buffers 222, 232, and 242, and the functional units of the instruction fetch unit 220, the instruction decoder 230, and the execution unit 240 for processing those first thread instructions may be called the "thread processing unit" of the first thread. Similarly, the combination of the units that respectively store the second thread instructions or microcodes of the buffers 222, 232, and 242, and the functional units of the instruction fetch unit 220, the instruction decoder 230, and the execution unit 240 for processing those second thread instructions may be called the "thread processing unit" of the second thread.

B3. Color Conversion Processing and Halftone Processing

Figure 3:
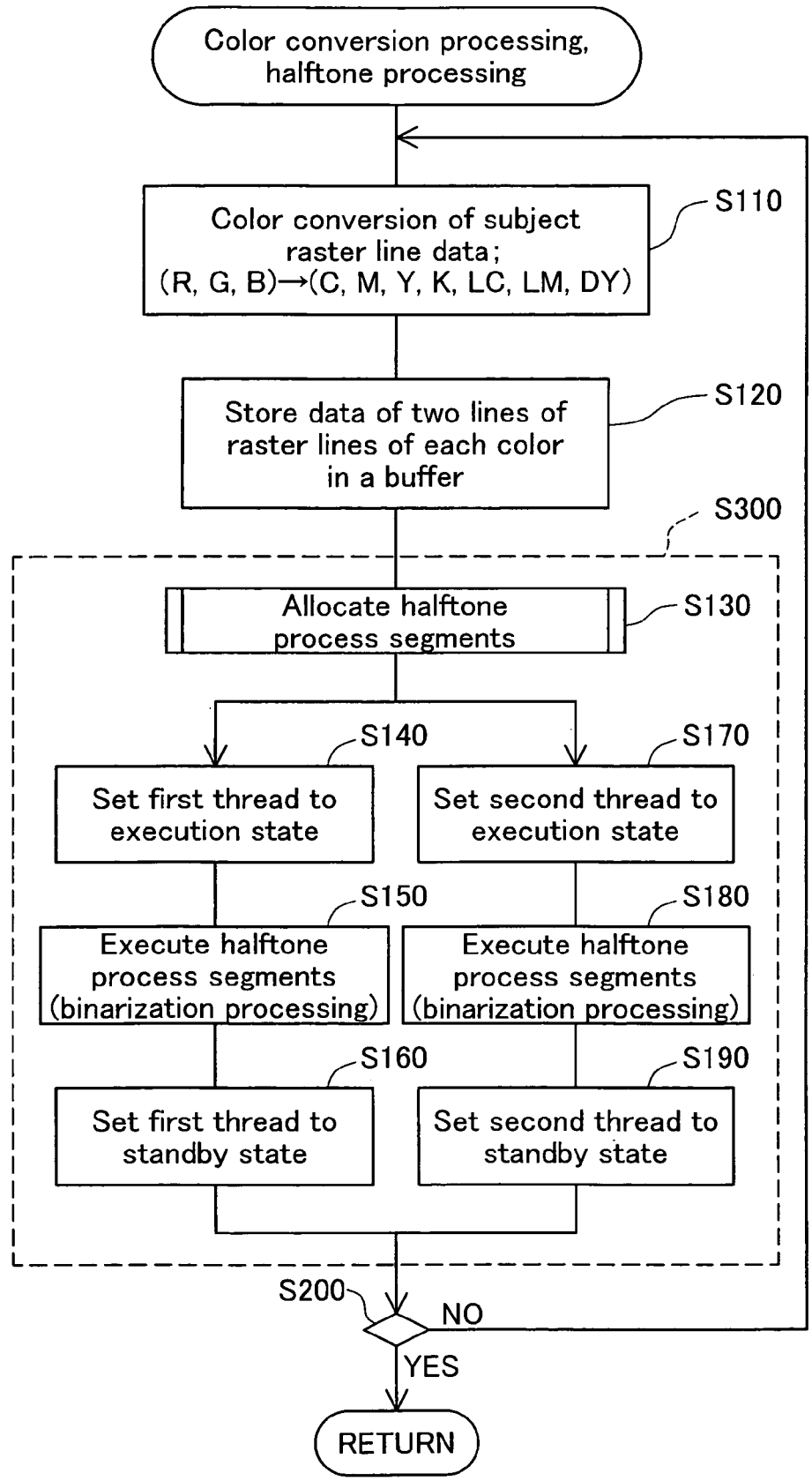
FIG. 3 is a flow chart showing the specific process flow of the color conversion processing and the halftone processing.
Figure 4:
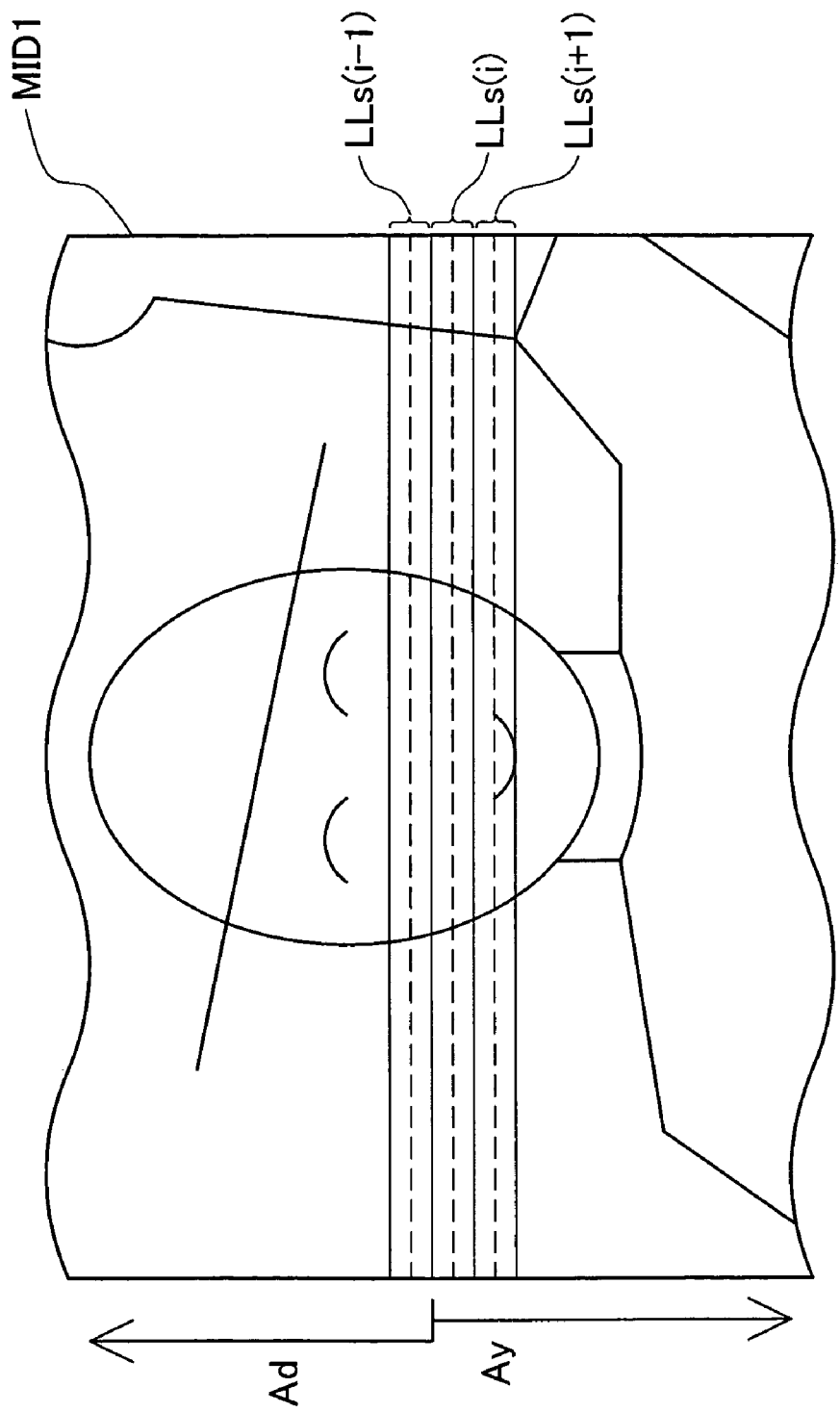
FIG. 4 shows the raster lines LLs (i) for performing color conversion processing and halftone processing.

FIG. 3 is a flow chart showing the basic process flow of the color conversion process and the halftone processing. FIG. 4 shows the raster lines LLs (i) for use in performing color conversion processing and halftone processing. In specific terms, the color conversion processing by the color conversion module 98 and the halftone processing by the halftone module 99 shown in FIG. 1 are performed for each two raster lines within the image data MID1. Specifically, the image data MID2 is transferred between the color conversion module 98 and the halftone module 99 as a partial image of two lines each of the raster lines.

FIG. 4 shows the two raster lines for use in performing color conversion processing and halftone processing as the subject raster lines LLs (i). The halftone processing of all the ink colors C, M, Y, K, LC, LM, and DY for this subject raster lines LLs (i) is called a "process segment set" hereafter.

Also, FIG. 4 shows the two raster lines for which color conversion processing and halftone processing were performed immediately prior to LLs (i) as the reference raster lines LLs (i−1). The area Ad that is above the subject raster lines LLs (i) is an area for which color conversion processing and halftone processing have already been performed. The subject raster lines LLs (i) and the area Ay that is below LLs (i) is an area for which color conversion processing and halftone processing have not yet been performed yet. The two raster lines indicated by LLs (i+1) are areas for which the next color conversion processing and halftone processing of the subject raster lines LLs (i) are to be performed.

When performing color conversion processing and halftone processing, first, at step S110 in FIG. 3, color conversion is performed. In specific terms, the color conversion table 104 (see FIG. 1) is referenced, and conversion is carried out to produce data expressed in tone values of cyan (C), magenta (M), yellow (Y), black (K), light cyan (LC), light magenta (LM), and dark yellow (DY). Then, at step S120, each data of the subject raster lines LLs (i) expressed by tone values of C, M, Y, K, LC, LM, and DY is stored in a buffer.

At step S300 (indicated by a broken line in FIG. 3) for performing halftone processing, halftone process segments for the ink colors are allotted to the two threads, and halftone processing is done for C, M, Y, K, LC, LM and DY accordingly. Here, for magenta, yellow, and dark yellow, halftone processing is performed using the dither method, and for the other colors, halftone processing is performed using the error diffusion method. Note that before step S300, the two threads are created in advance, and are in a standby state. It is also possible to create the threads every time the color conversion processing begins. However, if the threads are created in advance, it is possible to start processing in a short time, which is effective.

At step S130, the unit HT process segments are allocated to the two threads. The detailed processing contents are described later. Here, as a result of the allocation at step S130, for example the halftone process segments for cyan, yellow, black, and dark yellow are allocated to the first thread, and the halftone process segments for magenta, light cyan, and light magenta are allocated to the second thread.

At step S140, the first thread in a standby state goes to an execution state. Then, at step S150, for the first thread, halftone processing is performed for cyan, yellow, black, and dark yellow, for example. Then, when the halftone processing for those ink colors is finished, at step S160, the first thread again goes to a standby state. Note that at step S150, the time required for each halftone processing of cyan, yellow, black, and dark yellow is counted, and this is stored in the memory internal load memory unit 105 (see FIG. 1) of the computer 90.

Meanwhile, at step S170, the second thread that is in a standby state goes to an execution state. Then, at step S180, at the second thread, halftone processing is performed for magenta, light cyan, and light magenta, for example. Then, when the halftone processing for each of these ink colors is finished, at step S190, the second thread again goes to a standby state. Note that at step S180, the time required for each halftone processing of magenta, light cyan, and light magenta is counted, and this is stored in the memory internal load memory unit 105 of the computer 90.

At step S200, a judgment is made of whether color conversion processing and halftone processing have finished for all the raster lines contained in the image data MID1. If the color conversion processing and halftone processing have not finished for all the raster lines, the process is repeated from step S110 with the two raster lines LLs (i+1) adjacent on the underside of the already processed raster lines LLs (i) as the new subject raster lines (see FIG. 4). If color conversion processing and halftone processing have ended for all the raster lines of the image data MID1, then processing ends. Note that the process of step S130 is executed by the allocation unit 99a which is the functional unit of the halftone module 99. Then, the processing of steps S140 to S160 and steps S170 to S190 are executed by binarization unit 99b that is the functional unit of the halftone module 99. These functional parts are shown in FIG. 1.

Figure 5:
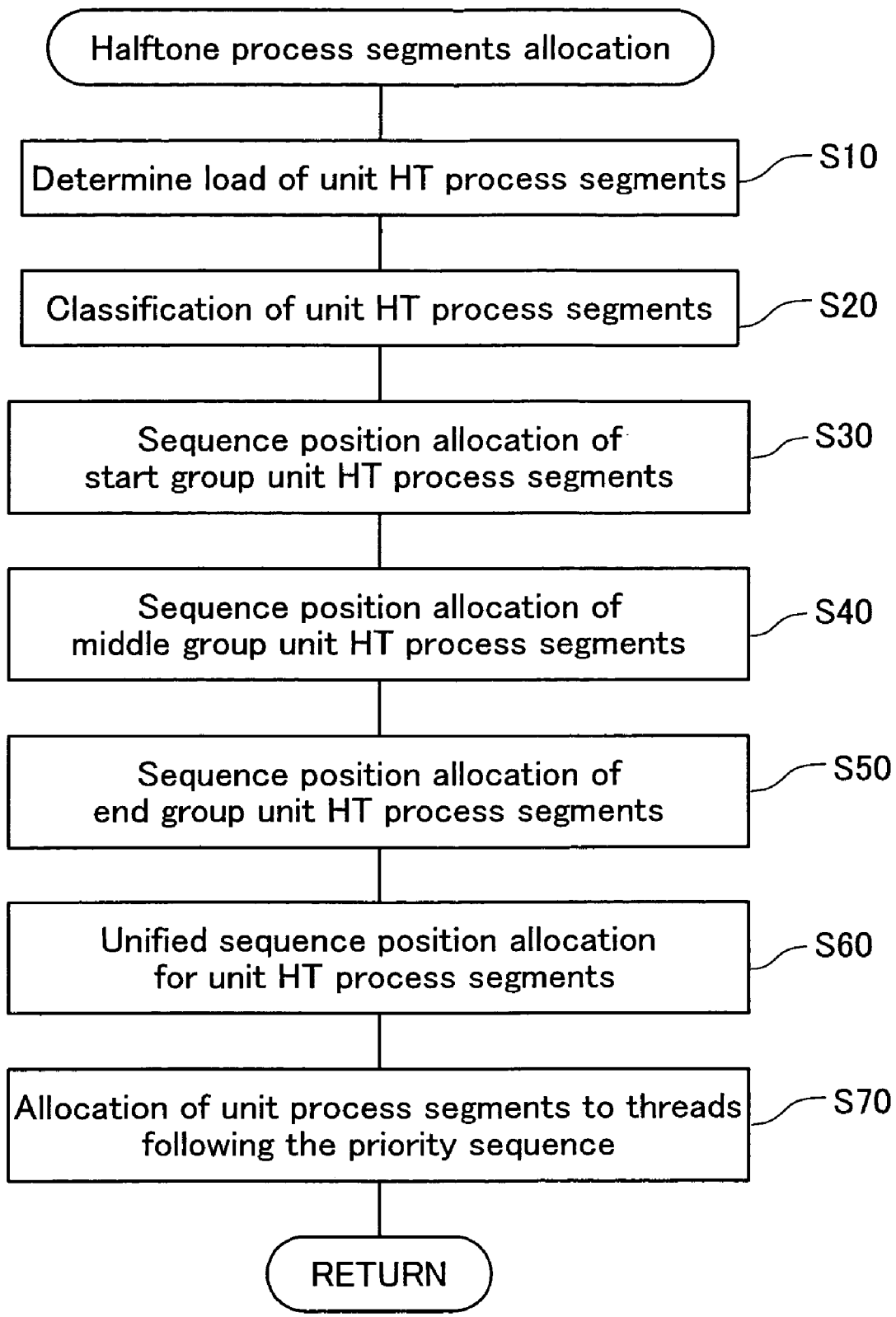
FIG. 5 is a flow chart showing the procedure for allocating the unit HT process segments of each color to threads at step S130 of FIG. 3.

FIG. 5 is a flow chart showing the procedure for allocating to the thread of each color unit HT process segment for step S130 in FIG. 3. At step S10, first, the load of each unit HT process segment is estimated for each color. Here, the processing time of the previous halftone processing time stored in the load memory unit 105 is fetched, and this is used as the load of each unit HT process segment.

FIGS. 6A to 6C show the procedure for allocating the unit HT process segments. FIG. 6A is a drawing expressing the estimated load of each unit HT process segment. In FIGS. 6A to 6C, each square represents the load of a unit HT process segment. The length of the square lateral direction represents the size of the load. The Lc, Lm, Ly, Lk, Llc, Llm, and Ldy in the squares means respectively that is the cyan, magenta, yellow, black, light cyan, light magenta, or dark yellow estimated load. The second-type unit HT process segments are shown with hatching.

In the images, areas adjacent to each other often have mutually similar data value of each color component. Specifically, for the areas adjacent to each other, there is a high possibility of the halftone processing load of the same color being similar to each other. Because of this, as described above, if the load of each unit HT process segment is determined based on the processing results of the reference raster lines LLs (i−1) for which halftone processing was performed immediately prior, it is possible to do accurate load estimation.

Note that depending on the image, there is a big difference in the data value of each color component with the subject raster lines LLs (i) and the reference raster lines LLs (i−1), and as a result, there are cases when there is a big difference in the unit HT process segment load of each color. This occurs in an image where a horizon line is drawn. However, with most of the portions within an image, the areas adjacent to each other have mutually similar data value of each color component. Because of this, even if the load estimate for some portions is skewed from the actual load, image processing can be performed effectively based on the accurate load estimate for the majority of the portions.

At step S20 of FIG. 5, the unit HT process segments of each color are classified into start group G1, middle group G2, and end group G3. The start group G1 consists of the unit HT process segments to be processed first for each thread. Allocated to the start group G1 are the unit HT process segments with the largest loads respectively for the unit HT process segments using the error diffusion method and the unit HT process segments using the dither method (see FIG. 6A). Note that for the first embodiment, the number of start group G1 unit HT process segments is equal to the number of threads.

Also, of the unit HT process segments of each color, one unit HT process segment with the smallest load is assigned to the end group G3 (see FIG. 6A). Note that for the first embodiment, the end group G3 is one unit HT process segment, but it is also possible to have 2 or more unit HT process segments as the end group G3. Then, the other unit HT process segments are assigned to the middle group G2.

As shown in FIG. 6A, here, the cyan and magenta unit HT process segments are used as the start group G1, and the dark yellow unit HT process segment is used as the end group G3. Then, the remaining light cyan, light magenta, yellow, and black unit HT process segments are used as the middle group G2.

As described previously, the halftone module 99 performs halftone processing using the error diffusion method for light cyan (LC), light magenta (LM), cyan (C), and black (K), and performs halftone processing using the dither method for magenta (M), yellow (Y), and dark yellow (DY). The unit HT process segments using the error diffusion method are called the "first-type of unit HT process segments," and the unit HT process segments using the dither method are called the "second-type of unit HT process segments."

At step S30 in FIG. 5, the halftone module 99 gives a sequence priority of the unit HT process segments classified as the start group G1 in sequence of decreasing load determined at step S10. Here, as shown in FIG. 6B, the cyan unit HT process segment that uses the error diffusion method takes the first position, and the magenta unit HT process segment that uses the dither method takes the second position. Note that in FIG. 6B, above the square representing each unit HT process segment, the group to which each unit HT process segment belongs and the sequence position within the group are indicated. For example, the "1-2" above the magenta unit HT process segment Lm means that this belongs to the start group G1 and the sequence position within the group is position 2.

At step S40, the halftone module 99 allocates a sequence position based on the load of each unit HT process segment determined at step S10 for the unit HT process segments classified as middle group G2. When doing this, starting from the first-type of unit HT process segment using the error diffusion method, sequence position allocation is done alternately in order of decreasing load size for the first-type and the second-type of unit HT process segments. This can be realized, for example, by tentatively allocating a sequence position in order of decreasing load respectively for the first-type and the second-type of unit HT process segments, and allocating a sequence position by selecting from the higher of the tentative sequence positions alternately for the first-type and the second-type of unit HT process segments.

Note that with the first embodiment, in the middle group G2, the second-type of unit HT process segment includes only one segment for yellow, while the first-type of unit HT process segment includes is three segments for light cyan, light magenta, and black. Because of this, as shown in FIG. 6B, from the first position to the third position in the middle group G2 are allocated a sequence position alternately for the first-type and the second-type of unit HT process segments, but for the third position and the fourth position, the same first-type of unit HT process segments are aligned.

At step S50, the halftone module 99 allocates a sequence position in order of decreasing load of each HT process determined at step S10 for the unit HT process segments classified as the end group G3. With the first embodiment, the dark yellow unit HT process segment is the only unit HT process segment classified as the end group G3. Accordingly, the dark yellow unit HT process segment takes the first position within the end group G3.

At step S60 of FIG. 5, each unit HT process segment is allocated an overall sequence position. At that time, the start group G1 unit HT process segments are given a higher sequence position than the other groups G2 and G3. Then, the unit HT process segments of the middle group G2 are given a higher sequence position than the end group G3. The sequence positions of the unit HT process segments within each group are the sequence positions set at steps S30 to S50. With the example in FIG. 6B, this is the sequence from upper left to lower right, which is the sequence "1-1, 1-2, 2-1, 2-2, 2-3, 2-4, 3-1."

FIG. 6C is an explanatory diagram showing the unit HT process segments allocated to the first and second threads. At step S70 of FIG. 5, the halftone is module 99 allocates each unit HT process segment to the first thread and the second thread following the sequence determined at step S60. In specific terms, after first allocating the unit HT process segments of the start group G1 to both threads, the next unit HT process segment in the priority sequence is allocated to the thread which has the smallest total load already allocated. As a result, the unit HT process segments are allocated to the first and second threads as shown in FIG. 6C. Note that in FIG. 6C, the reference numbers shown above the square representing each unit HT process segment is the same as the reference numbers shown in FIG. 6B. Specifically, these indicate (a) the group to which each unit HT process segment belongs and (b) the sequence position within the group.

At step S40, for the middle group G2 unit HT process segments, the first-type and the second-type unit HT process segments are allocated a sequence position alternately in order of decreasing load. Because of this, by allocating the unit HT process segments to the first thread and the second thread as described above, the allocation below is executed. Specifically, for the middle group G2, of the unit HT process segments that have not yet been allocated, and for which the halftone processing method is different from the unit HT process segment allocated to the thread immediately prior, the unit process segment having the biggest load is allocated to the thread with the smallest total load.

With the first embodiment, when the start group G1 is selected, the unit HT process segments are selected in sequence of decreasing estimated load from among the first-type and the second-type unit HT process segments. The unit HT process segments of the middle group G2 and the end group G3 are smaller in the estimated load than initially allocated process segments. Thus, when allocating the unit HT process segments of the middle group G2 and the end group G3 thereafter to the threads, equalization of the loads between threads becomes easier.

With the first embodiment, the end group G3 unit HT process segments for which the loads are smaller are allocated to threads after the middle group G2 for which the loads are bigger. Because of this, at the final stage of allocation of the unit HT process segments to each thread, it is possible to reduce the difference in load between threads by using the end group G3 unit HT process segments for which the estimated load is the smallest among the unit process groups. If there are two or more unit HT process segments in the end group G3, the following process is to be implemented. In case where there is a plurality of unit HT process segments in the end group G3, each segment will be allocated to the thread with the smaller total load of unit HT process segments allocated up to then. For this kind of aspect, a higher level of equalization of load between threads is achieved.

Working as described above, allocation of halftone process segments is executed at step S130 of FIG. 3. Note that at steps S150 and S180 of FIG. 3, each of the unit HT process segments allocated to the threads are executed at each thread, specifically, in order from the left following the alignment sequence of FIG. 6C. Specifically, the earlier a unit HT process segment was allocated for thread allocation, the earlier the actual color conversion process will be executed.

The halftone processing using the error diffusion method executed for the first-type of unit HT process segment has more conditional branches than halftone processing using the dither method. Because of this, for halftone processing using the error diffusion method, the CPU cannot use as is the instructions or data that are read in advance and stored inside cache memory. Then, the CPU goes to read instructions and data in the main memory frequently. As a result, it is necessary to wait for transfer of data from the main memory during process execution, and compared to when it is possible to use instructions or data stored in advance in the cache memory, the CPU processing efficiency drops. Then, for parallel processing using hyper threading technology, when executing halftone processing using the error diffusion method for both of the two threads, there is a lot of waiting of transfer of data from the main memory for both of the threads, and processing becomes delayed.

Meanwhile, the halftone processing using the dither method executed for the second-type of unit HT process segmenting has fewer conditional branches than the halftone processing using the error diffusion method. Because of this, for the halftone processing using the dither method, the CPU is able to use the instructions or data read in advance and stored within the cache memory. Thus, in parallel processing using hyper threading technology, in case where one of the threads executes halftone processing using the error diffusion method and the other thread executes using the dither method, the following process can be performed. That is, while the halftone processing using the error diffusion method is waiting for transfer of data from the main memory, the other processing can proceed with processing using the instructions and data within the cache memory. As a result, the processing efficiency is improved, and it is possible to complete the halftone processing of all the colors in a short time.

With the first embodiment, one each of the first-type of unit HT process segments using the error diffusion method and of the second-type of unit HT process segments using the dither method is selected as the start group G1. Then, those are executed first for each thread (see FIG. 6C). Because of this, at the time of starting the halftone processing of at least a certain image area (see the subject raster lines LLs (i) of FIG. 4), there is no parallel processing by both threads using the error diffusion method. Because of this, at least at the start time of the halftone processing of each image area, the processing of both threads are less likely to wait for data sent from the main memory together for very long time, so there is no delay. As a result, the computer resources are utilized effectively, and processing efficiency is improved.

Furthermore, with the first embodiment, at step S40, starting from the first-type of unit HT process segment, the first-type and the second-type unit HT process segments are allocated to sequence positions for the unit HT process segments of the middle group G2 alternately in sequence of decreasing load. Then, at step S70, the middle group G2 unit HT process segments are allocated following the sequence of step S40 to the thread with the lowest total load of the already allocated unit HT process segments. By using this aspect, the first-type of unit HT process segments using the error diffusion method and the second-type of unit HT process segments using the dither method are easily parallel processed by the two threads. As a result, the computer resources are utilized effectively, resulting in higher processing efficiency.

Note that if the overhead when switching processes is ignored, FIG. 6C can be understood as a Gantt chart. The first-type unit HT process segments and the second-type unit HT process segments are processed in parallel during the time segments indicated by Pp11, Pp12, and Pp 13 in FIG. 6C. With the first embodiment, the second-type of unit HT process segments are all executed in parallel with the first-type of unit HT process segments.

Note that with the first embodiment, processing was performed classified into the start group G1 and the middle group G2. However, when performing allocation of sequence positions within the middle group G2 so that the first-type and the second-type of unit HT process segments are aligned alternately, as with the first embodiment, the following process can be held. That is, when the start group G1 and the middle group G2 are combined as the middle group G2, the same results can be obtained. Specifically, the first-type and the second-type of unit HT process segments are executed first at each thread. Thus, the same results can be obtained even when using an aspect that does not classify the process segments into the start group G1 and the middle group G2.

C. Second Embodiment

The second embodiment is different from the first embodiment in terms of the method of allocation of sequence position of the middle group G2 in FIG. 5. Also, at steps S150 and S180 in FIG. 3, each unit HT process segment is executed in an order that is different from the order of allocation to each thread with step S70 in FIG. 5. The other points are the same as with the first embodiment.

Figure 7A:
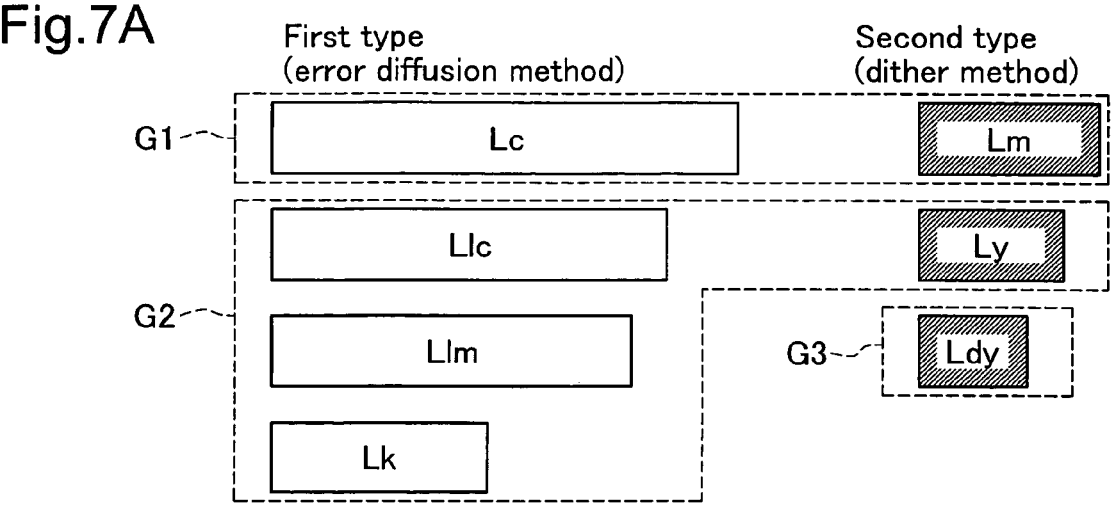
FIGS. 7A to 7C show the procedure for allocating unit HT process segments for the second embodiment.
Figure 7B:
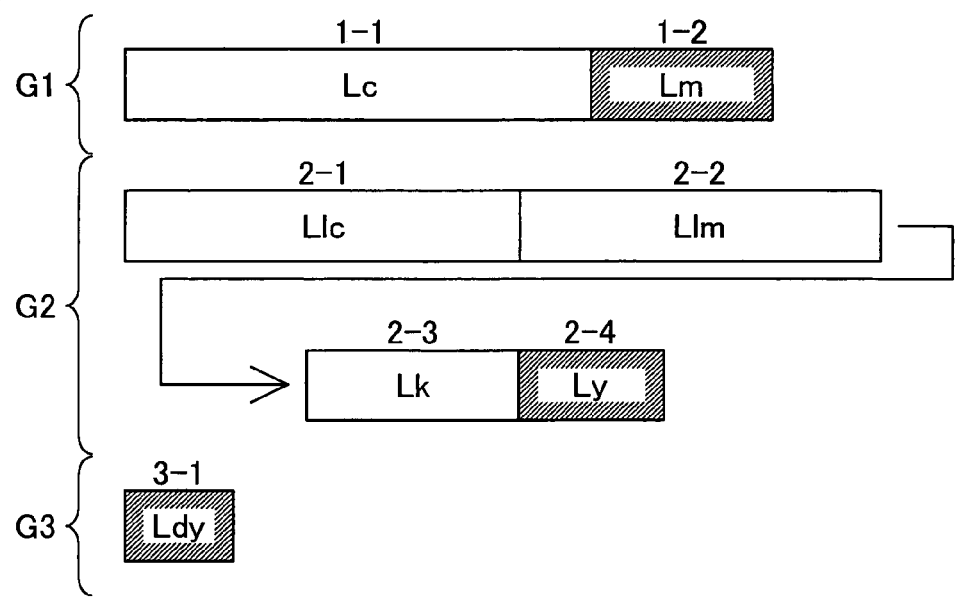
Figure 7C:
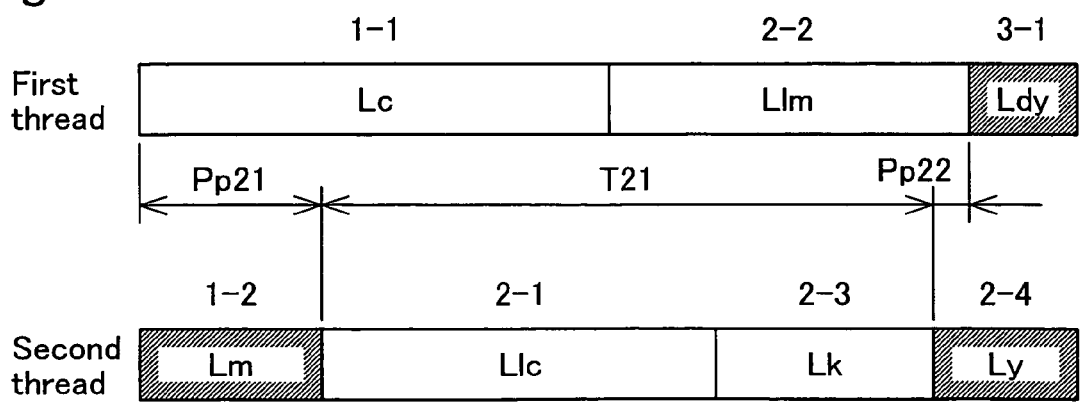

FIGS. 7A to 7C show the procedure for allocation of the unit HT process segments for the second embodiment. FIG. 7A is a drawing expressing the estimated load of each unit HT process segment. The notations in the drawing are the same as those in FIG. 6A. With the second embodiment, the allocation of the sequence position within the middle group G2 at step S40 of FIG. 5 is performed in sequence of the biggest estimated load, regardless of whether each unit HT process segment is the first-type of unit HT process segment and the second-type of unit HT process segment. As a result, the priority sequence of each unit HT process segment is as shown in FIG. 7B.

FIG. 7C shows the unit HT process segments allocated to the first and second threads with the second embodiment. The same as with the first embodiment, at step S70 of FIG. 5, the halftone module 99 allocates the unit HT process segments to the first thread and the second thread following the sequence determined at step S60. As a result, the cyan, light magenta, and dark yellow unit HT process segments are allocated to the first thread, and the magenta, light cyan, black, and yellow unit HT process segments are allocated to the second thread.

Figure 8:
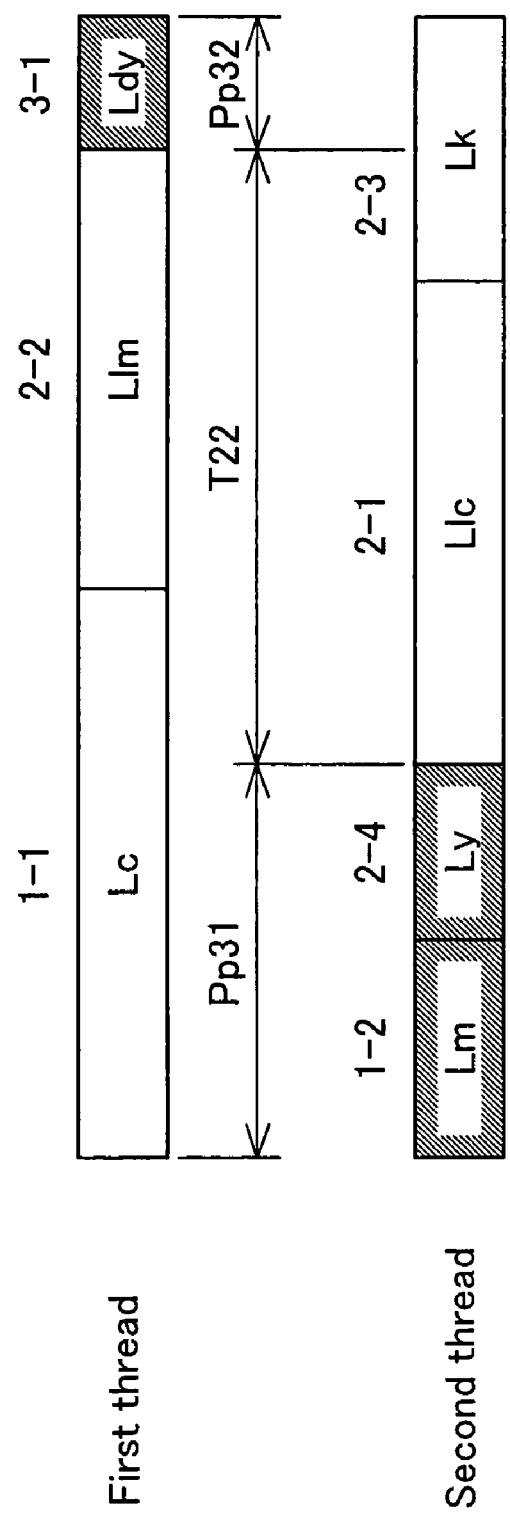
FIG. 8 shows the execution sequence of the unit HT process segments for each thread for the second embodiment.

FIG. 8 shows the execution sequence of the unit HT process segments for each thread with the second embodiment. Each unit HT process segment is executed in order from left to right. With the second embodiment, at step S150 of FIG. 3, the cyan unit HT process segment of the start group G1 is executed first with the first thread. Next, as shown in FIG. 8, the light magenta unit HT process segment that is the remaining first-type unit HT process segment is executed. After that, the dark yellow unit HT process segment that is the second-type unit HT process segment is executed.

Meanwhile, at step S180 in FIG. 3, the magenta unit HT process segment of the start group G1 is first executed with the second thread. Next, as shown in FIG. 8, the yellow unit HT process segment that is the remaining second-type unit HT process segment is executed. After that, the light cyan and black unit HT process segments that are the first-type unit HT process segments are executed. With the first thread, the first-type unit HT process segments are executed first, and with the second thread, the second-type unit HT process segments are executed first, and by doing this, the following kind of effect is obtained. Specifically, it becomes easier to do parallel processing of the first and the second-type unit HT process segments. As a result, the processing efficiency increases, making it possible to complete halftone processing of all the colors in a short time.

For example, when the unit HT process segments are executed at each thread in the allocation sequence of FIG. 7C, the light cyan and black first-type unit HT process segments are parallel processed with the cyan and light magenta unit HT process segments that are the same first-type unit HT process segments. Specifically, during time segment T21, the first-type unit HT process segments are parallel processed using the error diffusion method. However, by executing the unit HT process segments in the sequence like that shown in FIG. 8, part of the black first-type unit HT process segments are parallel processed with the dark yellow unit HT process segments that are the second-type unit HT process segment. Also, the cyan first-type unit HT process segments are parallel processed with, in addition to magenta, the yellow second-type unit HT process segment. Specifically, the parallel processing of the first-type of unit HT process segment using the error diffusion method is done during the time segment T22. As can be seen from FIG. 7C and FIG. 8, T22 is shorter than T21. Note that the parallel processing time of the first-type of unit HT process segment using the error diffusion method and the second-type of unit HT process segment using the dither method is indicated by Pp21 and Pp22 in FIG. 7C and by Pp31 and Pp32 in FIG. 8.

D. Third Embodiment

Figure 9:
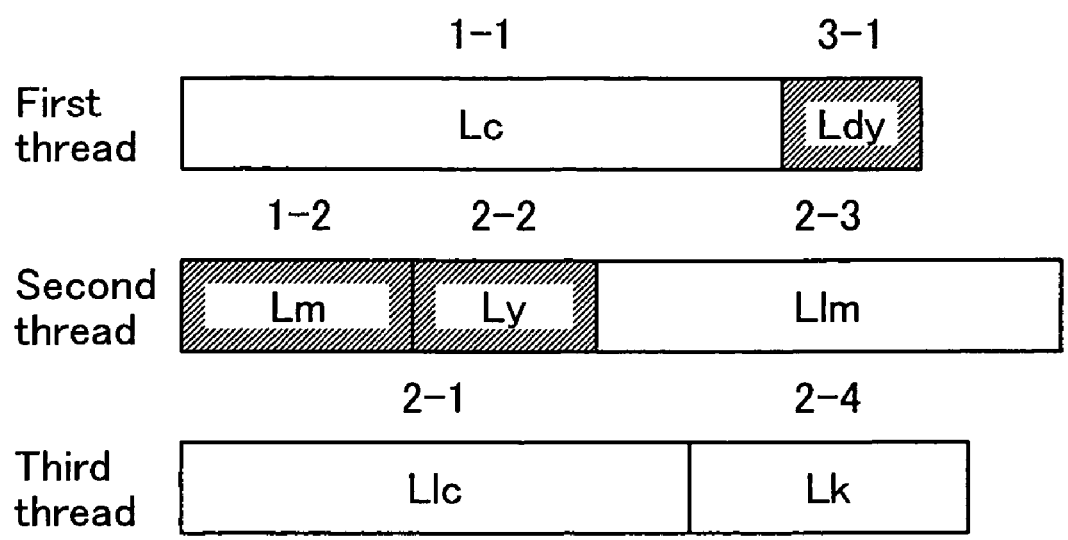
FIG. 9 shows the unit HT process segments allocated to the first to third threads for the third embodiment.

FIG. 9 shows the unit HT process segments allocated to the first through third threads for the third embodiment. With the third embodiment, there are three threads. The other points are the same as with the first embodiment.

At step S60 in FIG. 5, the allocation of sequence positions to the unit HT process segments is done as shown in FIG. 6B. Note that with the third embodiment, the number of the start group G1 unit HT process segments is lower than the number of threads. After that, at step S70 of FIG. 5, the unit HT process segments are allocated. The method of the allocation is the same as that of the first embodiment. Specifically, first, the start group G1 unit HT process segments are allocated to each thread, and after that, the middle group and the end group unit HT process segments are allocated to the thread with the lowest total load of allocated unit HT process segments according to the priority sequence.

With this kind of aspect as well, it is possible to allocate the unit HT process segments to the threads so that the first-type of unit HT process segments using the error diffusion method and the second-type of unit HT process segments using the dither method are easily parallel processed. For example, as shown in FIG. 9, with the third embodiment as well, the second-type of unit HT process segments are all parallel processed with the first-type of unit HT process segments. Specifically, the parallel processing of the first-type and the second-type of unit HT process segments is realized to its maximum limit. That is, all of the second-type of unit HT process segments are processed parallel with the first-type of unit HT process segments. Also, for the third embodiment as well, it is possible to equalize the load between each thread, the same way as with the first and second embodiments.

E. Modifications:

Note that the present invention is not limited to the aforementioned embodiments or examples, and can be implemented in various aspects that do not stray from the scope of the key points, with the following variations possible, for example.

E1. Modification 1:

With each of the embodiments noted above, after allocation of all of the unit HT process segments of the subject raster lines LLs (i) to each thread, the allocated unit HT process segments were executed with each thread (see FIG. 3 and FIG. 5). However, it is also possible to perform so-called real time scheduling in which the unit HT process segment to be processed next is allocated to each thread while executing the unit HT process segments at each thread. In such a case, it is possible to allocate one of the unit HT process segments selected according to the same priority sequence, as each of the embodiments, to the thread for which the unit HT process segments to be processed first run out and to execute that. If this kind of aspect is used, it is possible to newly allocate the next unit HT process segment to the thread judged to have the actually lower load of the unit HT process segments allocated up to that point. Because of this, when allocating unit HT process segments to the processing units so that the variation in load between threads is reduced, it is more difficult to be affected by the skew in the load estimates and actual processing time.

E2. Modification 2:

With the embodiments noted above, there were two or three threads. However, it is also possible to set four or more threads. However, with each of the aforementioned aspects of the present invention, it is especially effective to use these when the number of threads for executing the unit process segments is lower than the number of unit process segments. For aspects with three or more threads, when allocating the unit HT process segments in advance, it is preferable to allocate one of the unit process segments not yet allocated to a thread to the thread with the lowest total load of already allocated unit process segments from among the three or more threads. Then, in case allocating unit HT process segments while executing halftone process segment, it is preferable to allocate unit process segments to the thread for which execution of already allocated unit process segments were completed the earliest from among the three or more threads.

With each of the embodiments noted above, one CPU of the computer executes unit HT process segments with a plurality of threads using hyper threading. However, the unit HT process segments can also be distributed to a plurality of CPUs and executed. With this kind of aspect as well, using the same procedure as each of the aforementioned embodiments, it is possible to allocate each of the unit HT process segments to each of the CPUs so that the variation of the load between the CPUs is reduced.

Also, with each of the embodiments noted above, the threads were fixed at two or three threads. However, it is also possible to use an aspect for which it is possible to change according to circumstances the number of threads generated for the hyper threading or the number of CPUs used for multi-CPU computers. For example, the image processing device, which is one embodiment of the present invention, may use an aspect having a plurality of operating modes such as an operating mode having one thread, an operating mode having two threads, and an operating mode having three threads. When there are two or more processing units such as the thread or CPU, it is possible to perform load allocation and execution sequence determination using the same procedures as each of the embodiments noted above. When there is one processing unit, it is possible to have an aspect that executes each of the unit process segments on that processing unit following the pre-determined sequence.

E3. Modification 3:

With the embodiments noted above, the number of unit HT process segments to be processed first is two. However, it is also possible to have the number of unit HT process segments to be processed first be three or more. However, that number is a number that is the same or less than the number of threads (processing units). Then, it is preferable that the group of unit HT process segments to be processed first include a plurality of different types of unit process segments. Furthermore, when there are two types of unit process segments and the number of unit HT process segments to be processed first is equal to the number of processing units, it is preferable to arrange as described below. Specifically, within the group of unit HT process segments to be processed first (start group G1), it is preferable that the number of one type of unit process segments be 30 to 70% of the number of the other type of unit process segments, and more preferably to be 40 to 60%. Then, it is more preferable that the number of one type of unit process segments be 45 to 55% of the number of the other type of unit process segments, and even more preferable that the number of the other type of unit process segments be the same number plus or minus 1.

E4. Modification 4:

With each of the embodiments noted above, when estimating the load of each of the unit HT process segments, the processing time of each unit HT process segment for the area LLs (i−1) for which halftone processing was performed immediately prior to the area LLs (i) was used as the load of the unit HT process segment of the corresponding ink color. However, it is also possible for the estimation of the load of unit HT process segmenting to be performed based on other values. For example, it is possible to use the generation volume or generation probability of dots of each ink color within the area LLs (i−1) for which halftone processing was performed immediately prior as the load of each unit HT process segment for the area LLs (i) for performing the next halftone processing.

Also, for the unit HT process segments for which the halftone processing method is the same, it is also possible to set the load to be uniform. For example, it is possible to use 1 as the load of unit HT process segments for performing halftone processing using the dither method, and to use 3 as the load for the unit HT process segments for performing halftone processing using the error diffusion method. Furthermore, it is also possible to set the load based on the kind of the halftone processing method, the processing time, dot generation volume and/or generation probability described above. For example, it is possible to use 1×[dot generation probability] as the load of the unit HT process segments for performing halftone processing using the dither method, and to use 3×[dot generation probability] as the load of unit HT process segments for performing halftone processing using the error diffusion method. Specifically, the unit process load estimate may be determined considering the execution results of each unit process included in the process segment set executed immediately prior.

E5. Modification 5:

With each of the embodiments described above, the end group G3 which is allocated to a thread at the end includes one unit HT process segment. However, it is also possible to have the number of unit HT process segments that the end group G3 includes be two, or to be three or more. Specifically, the end group which is allocated to threads after the start and middle groups may include one or more unit process segments. Then, compared to the start and middle group unit HT process segments, it is preferable that the unit HT process segments have a smaller estimated load.

E6. Modification 6:

With the second embodiment, including the cyan unit HT process segments of the start group G1 to be executed first, the first-type of unit HT process segments are executed ahead of the second-type of unit HT process segments at the first thread (see FIG. 8). Then, the second-type of unit HT process segments including the magenta unit HT process segments of the start group G1 to be executed first are executed ahead of the first-type of unit HT process segments at the second thread. However, it is also possible to have the type of unit HT process segment of the start group G1 to be executed first be a different type from the unit HT process segments processed by priority after that.

For example, the following embodiment may be reduced. That is, the unit HT process segment to be executed first in a processing unit (a thread), which is one of the unit HT process segments of the start group G1, is the first-type unit process segment, after that first-type of unit HT process segment, the second-type unit process segments may be executed prior to the rest of the first-type unit process segments.

Specifically, when executing the unit process segments, a plurality of second-type unit process segments are executed consecutively before at least one of the first-type unit process segment at least in one processing unit. A plurality of the first-type unit process segments may be executed consecutively before at least one of the second-type unit process segments in at least one of the other processing units. Note that it is preferable that all of the allocated first-type unit process segments are executed before all of the allocated second-type unit process segments in at least one processing unit, and all of the allocated second-type unit process segments are executed before all of the allocated first-type unit process segments in one of the other processing units.

E7. Modification 7:

When the printer 22 which receives the printing image data FNL is able to form dots of a plurality of types of sizes such as large, medium, small for the same ink color, the halftone processing is performed using units of each dot type for each ink color. With each of the embodiments noted above, the unit HT process segments were halftone processing for each ink color, but for this kind of aspect, it is possible to have the unit HT process segment be halftone processing in units of each dot type for each ink color.

E8. Modification 8:

With the aforementioned embodiments, it is also possible to replace part of the constitution realized using hardware with software, and conversely, to replace part of the constitution realized using software with hardware. For example, it is also possible to have the CPU 41 of the printer execute part of the functions of the printer driver 96 (see FIG. 1).

A computer program for realizing this kind of function is provided in a format recorded on a computer readable recording medium such as a floppy disk, a CD-ROM, etc. The host computer reads the computer program from that recording medium and transfers it to either an internal storage device or an external storage device. Alternatively, it is also possible to supply the computer program to the host computer from a program supply device via a communication path. When realizing the computer program functions, the computer program stored in the internal storage device is executed by the microprocessor of the host computer. It is also possible to have the host computer directly execute the computer program recorded in the recording medium.

With this specification, a computer is a concept that includes a hardware device and an operating system, and means a hardware device that operates under the control of the operating system. The computer program executes the functions of each part described above on this kind of computer. Note that part of the functions described above may also be realized not by a driver or an application program but rather by the operating system.

Note that with this invention, a "computer readable recording medium" is not limited to a portable type recording medium such as a flexible disk or a CD-ROM, but also includes internal storage devices within the computer such as various types of RAM or ROM or the like, and external storage devices fixed to a computer such as a hard disk.

The Program product may be realized as many aspects. For example:

(i) Computer readable medium, for example the flexible disks, the optical disk, or the semiconductor memories;
(ii) Computer including the computer readable medium, for example the magnetic disks or the semiconductor memories; and
(iii) Computer temporally storing the computer program in the memory through the data transferring means.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. An image processing method comprising:
   providing M processing units where M is an integer of at least two;
   providing a plurality of process segment sets each having N unit process segments where N is an integer of at least three and greater than M, the N unit process segments including a first-type process segment using a first processing method and a second-type process segment using a second processing method different from the first processing method; and executing the N unit process segments of each process segment set using the M processing units, wherein selected M unit process segments among the N unit process segments are first executed in parallel by the M processing units, the M unit process segments including at least one first-type process segment and at least one second-type segment.

2. The method recited in claim 1, wherein each of the unit process segments is halftone processing, and the process segment set is a set of N halftone processing segments for a same area of an image.

3. The method recited in claim 2, wherein the first processing method is an error diffusion method, and the second processing method is a dither method.

4. The method recited in claims 1, wherein the executing the N unit process segments further includes:

(a) estimating loads of the N unit process segments in a next process segment set based on a result of unit process segments in a preceding process segment set;

(b) allocating the N unit process segments to the M processing units based on the estimated loads; and (c) executing the N unit process segments on the M processing units in allocated sequences, wherein the step (b) includes:

(b1) selecting one unit process segment from among remaining unit process segments which are not yet allocated to one of the processing units in the next process segment set according to a priority sequence in which the first-type unit process segment and the second-type unit process segment are aligned alternately;

the first-type unit process segments are aligned each other in sequence of decreasing estimated load; and the second-type unit process segments are aligned each other in sequence of decreasing estimated load;

(b2) allocating the selected unit process segment to a processing unit having a lowest total estimated load of already allocated unit process segments among the M processing units; and (b3) executing the steps (b1) and (b2) repeatedly.

5. The method recited in claim 4, wherein the executing the N unit process segments further comprises:

classifying the N unit process segments into unit process segments subject to the step (b1) and unit process segments that are not subject to the step (b1) and for which the estimated load is lower than that of the unit process segments subject to the step (b1), wherein the step (b) further includes (b4) after the step (b3), allocating the unit process segments not subject to the step (b1) to a processing unit having a lowest total estimated load of already allocated unit process segments.

6. The method recited in claim 1, wherein the executing the N unit process segments further includes:

(a) estimating loads of the N unit process segments in a next process segment set based on a result of unit process segments in a preceding process segment set;

(b) allocating the N unit process segments to the M processing units based on the estimated loads;

(c) continuously executing a plurality of allocated second-type unit process segments prior to allocated first-type unit process segment on at least one of the M processing units; and (d) continuously executing a plurality of allocated first-type unit process segments prior to allocated second-type unit process segment on at least one of the other processing units of the M processing units, wherein the step (b) includes:

(b1) selecting one unit process segment from among remaining unit process segments which are not yet allocated to one of the processing units in the next process segment set according to a priority sequence of decreasing estimated loads, (b2) allocating the selected unit process segment to a processing unit having a lowest total estimated load of already allocated unit process segments among the M processing units, and (b3) executing the steps (b1) and (b2) repeatedly.

7. The method recited in claim 6, wherein the executing the N unit process segments further comprises:

classifying the N unit process segments into unit process segments subject to the step (b1) and unit process segments that are not subject to the step (b1) and for which the estimated load is lower than that of the unit process segments subject to the step (b1), wherein the step (b) further includes (b4) after the step (b3), allocating the unit process segments not subject to the step (b1) to a processing unit having a lowest total estimated load of already allocated unit process segments.

8. The claim recited in claim 1, wherein the executing the N unit process segments further includes:

(a) estimating loads of the N unit process segments in a next process segment set based on a result of unit process segments in a preceding process segment set; and (b) allocating the N unit process segments to the M processing units based on the estimated loads and executing the N unit process segments on the M processing units, wherein the step (b) includes:

(b1) selecting one unit process segment from among remaining unit process segments which are not yet allocated to one of the processing units in the next process segment set according to a priority sequence in which the first-type unit process segment and the second-type unit process segment are aligned alternately;

the first-type unit process segments are aligned each other in sequence of decreasing estimated load; and the second-type unit process segments are aligned each other in sequence of decreasing estimated load;

(b2) allocating the selected unit process segment to a processing unit for which unit process segments to be processed first run out among the M processing units, and executing the selected unit process on the processing unit; and (b3) executing the steps (b1) and (b2) repeatedly.

9. The method recited in claim 8, wherein the executing the N unit process segments further comprises:

classifying the N unit process segments into unit process segments subject to the step (b1) and unit process segments that are not subject to the step (b1) and for which the estimated load is lower than that of the unit process segments subject to the step (b1), wherein the step (b) further includes (b4) after a step (b3), selecting and allocating the unit process segments not subject to the step (b1) to a processing unit for which unit process segments to be processed first run out and executing the selected unit process on the processing unit.

10. The claim recited in claim 1, wherein the executing the N unit process segments further includes:

(a) estimating loads of the N unit process segments in a next process segment set based on a result of unit process segments in a preceding process segment set; and (b) allocating the N unit process segments to the M processing units based on the estimated loads and executing the N unit process segments on the M processing units, wherein the step (b) includes:

(b1) selecting one unit process segment from among remaining unit process segments which are not yet allocated to one of the processing units in the next process segment set according to a priority sequence of decreasing estimated loads, (b2) allocating the selected unit process segment to a processing unit for which unit process segments to be processed first run out among the M processing units, and executing the selected unit process on the processing unit; and (b3) executing the steps (b1) and (b2) repeatedly.

11. An image processing device comprising:

M processing units where M is an integer of at least two, wherein the image processing device receives a plurality of process segment sets each having N unit process segments where N is an integer of at least three and greater than M, the N unit process segments including a first-type process segment using a first processing method and a second-type process segment using a second processing method different from the first processing method; and executes the N unit process segments of each process segment set using the M processing units, wherein selected M unit process segments among the N unit process segments are first executed in parallel by the M processing units, the M unit process segments including at least one first-type process segment and at least one second-type segment.

12. The image processing device recited in claim 11 executing the process segment set by hyper threading, wherein each of the processing units is a thread.

13. A computer program product for image processing comprising:

a computer readable medium; and a computer program stored on the computer readable medium, the computer program comprising:

a portion for receives a plurality of process segment sets each having N unit process segments where N is an integer of at least three, the N unit process segments including a first-type process segment using a first processing method and a second-type process segment using a second processing method different from the first processing method; and a portion for executing the N unit process segments of each process segment set using M processing units where M is an integer of at least two and less than N, wherein selected M unit process segments among the N unit process segments are first executed in parallel by the M processing units, the M unit process segments including at least one first-type process segment and at least one second-type segment.

14. The computer program product recited in claim 13, wherein the portion for executing the N unit process segments executes the process segment set by hyper threading, wherein each of the processing units is a thread.

15. The computer program product recited in claim 13, wherein the portion for executing the N unit process segments includes:

a first portion for estimating loads of the N unit process segments in a next process segment set based on a result of unit process segments in a preceding process segment set;

a second portion for allocating the N unit process segments to the M processing units based on the estimated loads; and a third portion for executing the N unit process segments on the M processing units in allocated sequences, wherein the second portion includes:

a fourth portion for selecting one unit process segment from among remaining unit process segments which are not yet allocated to one of the processing units in the next process segment set according to a priority sequence in which the first-type unit process segment and the second-type unit process segment are aligned alternately;

the first-type unit process segments are aligned each other in sequence of decreasing estimated load; and the second-type unit process segments are aligned each other in sequence of decreasing estimated load;

a fifth portion for allocating the selected unit process segment to a processing unit having a lowest total estimated load of already allocated unit process segments among the M processing units; and a sixth portion for having the fourth and fifth portion execute repeatedly.

16. The computer program product recited in claim 13, wherein the portion for executing the N unit process segments includes:

a first portion for estimating loads of the N unit process segments in a next process segment set based on a result of unit process segments in a preceding process segment set;

a second portion for allocating the N unit process segments to the M processing units based on the estimated loads;

a third portion for continuously executing a plurality of allocated second-type unit process segments prior to allocated first-type unit process segment on at least one of the M processing units; and a fourth portion for continuously executing a plurality of allocated first-type unit process segments prior to allocated second-type unit process segment on at least one of the other processing units of the M processing units, wherein the second portion includes:

a fifth portion for selecting one unit process segment from among remaining unit process segments which are not yet allocated to one of the processing units in the next process segment set according to a priority sequence of decreasing estimated loads, a sixth portion for allocating the selected unit process segment to a processing unit having a lowest total estimated load of already allocated unit process segments among the M processing units, and a seventh portion for having the fifth and sixth portion execute repeatedly.

17. The computer program product recited in claim 13, wherein the portion for executing the N unit process segments includes:

a first portion for estimating loads of the N unit process segments in a next process segment set based on a result of unit process segments in a preceding process segment set; and a second portion for allocating the N unit process segments to the M processing units based on the estimated loads and executing the N unit process segments on the M processing units, wherein the second portion includes:

a third portion for selecting one unit process segment from among remaining unit process segments which are not yet allocated to one of the processing units in the next process segment set according to a priority sequence in which the first-type unit process segment and the second-type unit process segment are aligned alternately;

the first-type unit process segments are aligned each other in sequence of decreasing estimated load; and the second-type unit process segments are aligned each other in sequence of decreasing estimated load;

a fourth portion for allocating the selected unit process segment to a processing unit for which unit process segments to be processed first run out among the M processing units, and executing the selected unit process on the processing unit; and a fifth portion for having the third and fourth portion execute repeatedly.

18. The computer program product recited in claim 13, wherein the portion for executing the N unit process segments includes:

a first portion for estimating loads of the N unit process segments in a next process segment set based on a result of unit process segments in a preceding process segment set; and a second portion for allocating the N unit process segments to the M processing units based on the estimated loads and executing the N unit process segments on the M processing units, wherein the second portion includes:

a third portion for selecting one unit process segment from among remaining unit process segments which are not yet allocated to one of the processing units in the next process segment set according to a priority sequence of decreasing estimated loads, a fourth portion for allocating the selected unit process segment to a processing unit for which unit process segments to be processed first run out among the M processing units, and executing the selected unit process on the processing unit; and a fifth portion for having the third and fourth portion execute repeatedly.

* * * * *